C. E. YAGER.
Tethers.
No. 217,254.  Patented July 8, 1879.
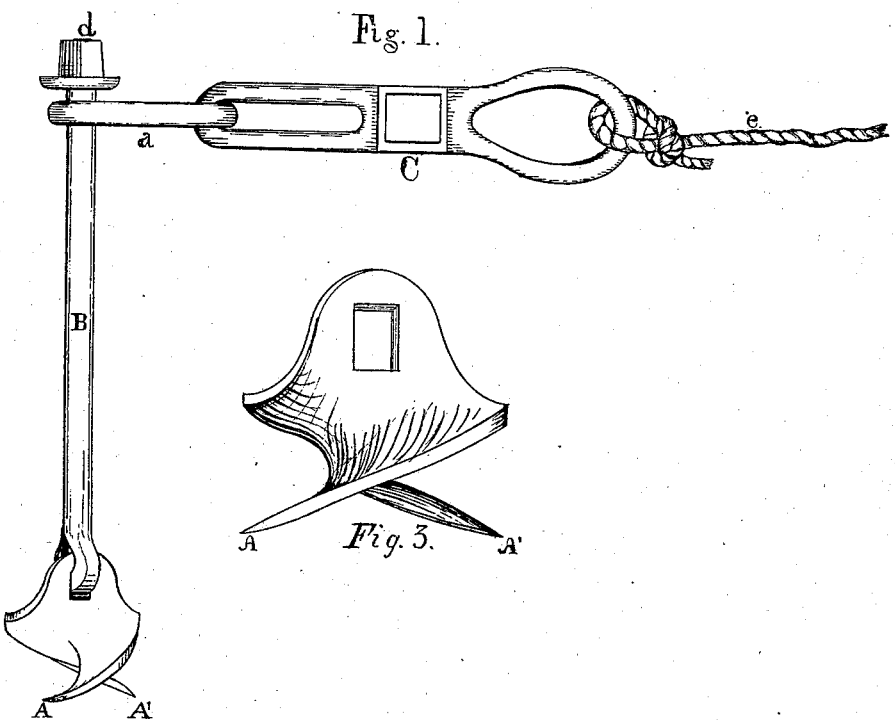
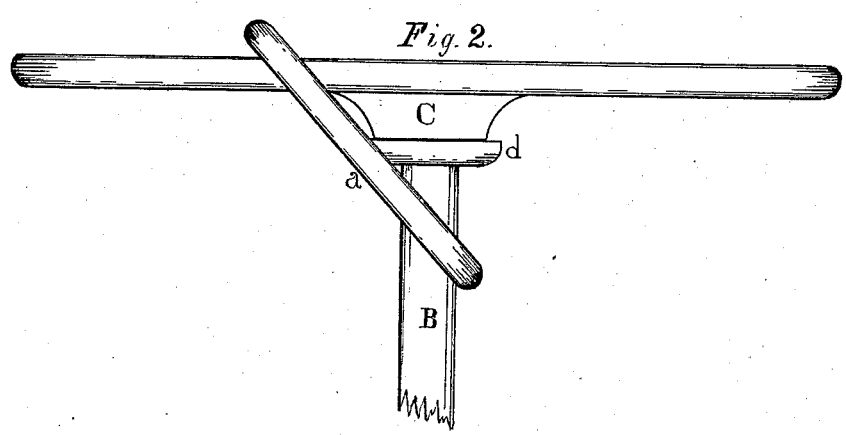
WITNESSES.
J. W. Rowley
Giles H. O'Neil
INVENTOR.
Chas. E. Yager

UNITED STATES PATENT OFFICE.

CHARLES E. YAGER, OF STOCKPORT, NEW YORK.

IMPROVEMENT IN TETHERS.

Specification forming part of Letters Patent No. 217,254, dated July 8, 1879; application filed May 23, 1879.

*To all whom it may concern:*

Be it known that I, CHARLES E. YAGER, of the town of Stockport, in the county of Columbia and State of New York, have invented a new and Improved Tether or Picket-Pin, of which the following is a specification.

This invention is designed to be used as a tie, stake, or pin for confining animals to a limited range or space.

The object of my invention is to provide a fastening for this purpose that can be easily inserted without displacing the ground, that is reliable and firm when inserted, that is light and easy to carry and to handle, and that is complete in itself, not requiring any extra tool or implement to insert or fix it in the ground.

It consists in a spirally-flanged or two-winged metallic plate attached firmly to the bottom end of an iron stake or pin, each wing having a cutting or straight edge with a spirally-curved margin, the edges forming with each other at the center or point of divergence an angle of about ninety degrees, and with the vertical center line of the stake at an angle of about forty-five degrees, and also in not having a center pin or guide.

It further consists in connecting with this iron stake, (so armed with the flanged bottom piece,) by means of a loose metallic link, a link and loop piece combined, provided with a square mortise in the middle to fit onto the flanged nut on top end of the stake, and which serves as a wrench or handle with which to insert and remove it from the ground, the loop end alone, when removed from the nut, being employed to attach the rope or tie to.

In the accompanying drawings, in which similar letters of reference indicate like parts, Figure 1 is a perspective elevation of my invention, showing all its parts connected and extended as when in use. Fig. 2 is a side elevation when the link and loop piece is attached as a handle; and Fig. 3, a front or flat side view of the spirally-flanged or winged bottom piece detached.

A A' are the bottom points of the spiral flanges or wings, employed to penetrate the ground, attached to the bottom of stake B.

A square-headed flanged nut, $d$, is riveted to the top of this stake, on which the link and loop piece is fitted, by means of the mortise C, whenever it is desired to insert or to remove it from the ground. $a$ is the connecting-link which couples the link and loop piece with the stake B, and on which it turns freely and slides up and down.

The rope attached to the animal is tied at its opposite end in the loop end of the link and loop piece, as shown in Fig. 1.

When the pin is to be inserted in the ground one end of the loose link $a$ is drawn up to the top nut, $d$, on the stake B, and the opposite end brought close enough to the nut-socket or mortise C in the middle of the link and loop piece to allow the mortise to be placed upon the square head of the flanged nut $d$, raised side downward. The points A A' resting on the ground, the hands are applied with moderate pressure, as in boring with an auger, when they immediately and rapidly descend into the ground to the depth required, which, to hold firmly, will depend upon the looseness or tenacity of the soil.

In the original drawings, Fig. 1 is half the ordinary size, and Figs. 2 and 3 the full size, of the ordinary tether as I now make it; but I do not intend to confine myself to any particular size.

The material employed for their construction is cast-iron for the spiral flange piece, the loop and link piece, and the flanged nut $d$, and wrought-iron for the stake B and loose link $a$.

Having no center point to direct its course or confine its descent to a direct line, when coming in contact with small roots or stones the points A A' pass off laterally or under or around the same.

With a center pin or directing-point it would be necessary for the bottom edge of the flanges to be sharp enough to sever the roots before it could escape them, or if stones to remove them before it could descend, and it would also elevate and displace the ground as the bit and auger do their chips. Being without a center pin or guide the flanges may wander or move laterally whenever their descent in a direct line is impeded, or if it meets a root it will pass around, under, or off on one side of it and still on downward.

What I claim is—

The stake B, bottom piece having spiral flanges or wings, top nut, $d$, loose link $a$, and link and loop piece with mortise C, all constructed, combined, and arranged substantially as and for the purpose above set forth.

CHAS. E. YAGER.

Witnesses:
GILES H. O'NEIL,
J. V W. ROWLEY.